United States Patent
Reiter, Jr. et al.

(10) Patent No.: US 6,889,419 B2
(45) Date of Patent: May 10, 2005

(54) METHOD OF MAKING A COMPOSITE ELECTRIC MACHINE COMPONENT OF A DESIRED MAGNETIC PATTERN

(75) Inventors: Frederick B. Reiter, Jr., Cicero, IN (US); Tom L. Stuart, Pendleton, IN (US)

(73) Assignee: Delphi Technologies, Inc., Troy, MI (US)

( * ) Notice: Subject to any disclaimer, the term of this patent is extended or adjusted under 35 U.S.C. 154(b) by 339 days.

(21) Appl. No.: 10/123,804

(22) Filed: Apr. 16, 2002

(65) Prior Publication Data

US 2003/0192169 A1 Oct. 16, 2003

(51) Int. Cl.[7] .................. H02K 15/00; H02K 15/14; H02K 15/16
(52) U.S. Cl. .................. 29/596; 29/597; 29/598; 29/605; 29/606; 29/607; 29/608; 29/609; 29/732; 310/156.38; 310/156.43; 310/254; 75/246; 419/6
(58) Field of Search .................. 29/596–598, 605–609, 29/732; 419/6; 310/156.38, 156.43, 254; 75/246

(56) References Cited

U.S. PATENT DOCUMENTS

| | | | |
|---|---|---|---|
| 2,913,819 A | * | 11/1959 | Andreotti et al. .............. 419/6 |
| 3,909,647 A | * | 9/1975 | Peterson ................. 310/156.12 |
| 4,255,494 A | | 3/1981 | Reen et al. .................. 428/551 |
| 4,818,305 A | | 4/1989 | Steingroever ............... 148/103 |
| 5,554,900 A | * | 9/1996 | Pop, Sr. .................. 310/156.61 |
| 5,870,818 A | | 2/1999 | Bisaga ......................... 29/607 |
| 5,982,073 A | * | 11/1999 | Lashmore et al. .......... 310/254 |
| 6,117,205 A | * | 9/2000 | Krause et al. ................. 75/246 |
| 6,437,477 B1 | | 8/2002 | Krefta et al. |
| 6,455,978 B1 | | 9/2002 | Krefta et al. |
| 6,538,358 B1 | | 3/2003 | Krefta et al. |

FOREIGN PATENT DOCUMENTS

| | | |
|---|---|---|
| DE | 19912470 | 10/2000 |
| JP | 09117084 | 2/1997 |
| WO | WO 98/47215 | 10/1998 |

* cited by examiner

Primary Examiner—Carl J. Arbes
Assistant Examiner—Tim Phan
(74) Attorney, Agent, or Firm—Jimmy L. Funke

(57) ABSTRACT

A method of making composite electric machine components. Magnetic segments and non-magnetic segments are separately formed to green strength, and then arranged adjacent to each other in a desired magnetic pattern. A small amount of powder material is added in-between the segments, and the whole assembly is then sintered to form a sinterbonded composite component of high structural integrity.

15 Claims, 6 Drawing Sheets

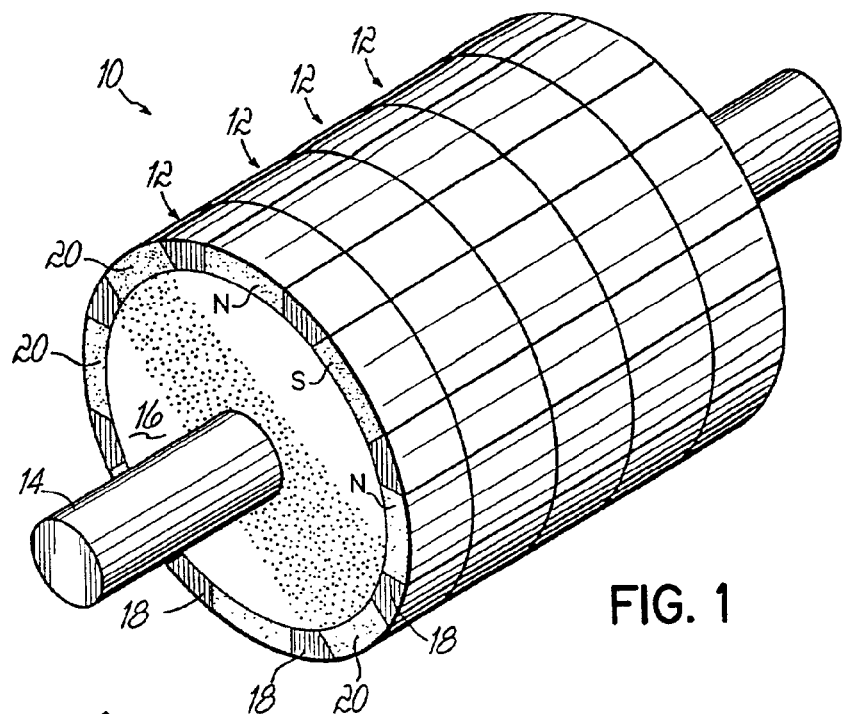
FIG. 1
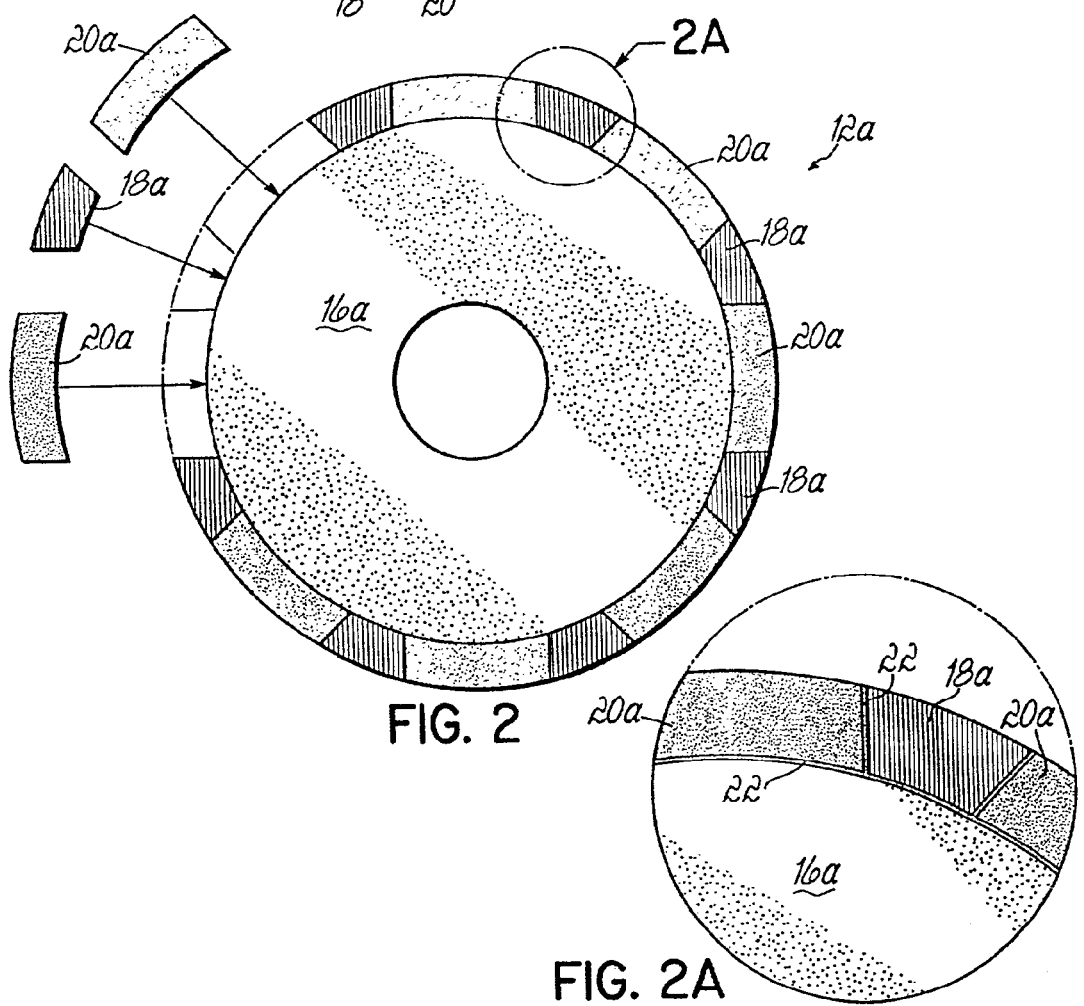
FIG. 2
FIG. 2A

METHOD OF MAKING A COMPOSITE ELECTRIC MACHINE COMPONENT OF A DESIRED MAGNETIC PATTERN

FIELD OF THE INVENTION

This invention relates generally to composite electric machine rotor components and rotor sense parts, and more particularly, to the manufacture of rotor components and rotor sense parts by sinterbonding.

BACKGROUND OF THE INVENTION

It is to be understood that the present invention is equally applicable in the context of generators as well as motors. However, to simplify the description that follows, reference to a motor should also be understood to include generators.

In the field of electric machine rotor cores, stator cores and generators, the machine cores are typically constructed using laminations stamped from electrical steel. The laminations are stacked and pressed onto a shaft. Then, in most electric machines, windings or permanent magnets are added. These laminations are configured to provide a machine having magnetic, non-magnetic, plastic and/or permanent magnet regions to provide the flux paths and magnetic barriers necessary for operation of the machines. When the shape of the laminations and/or the additional winding/permanent magnet components are compromised, reduced operating speed and flux leakage may occur, thus limiting performance of the electric machine. By way of example, synchronous reluctance rotors formed from stacked axial laminations are structurally weak due to problems associated both with the fastening together of the laminations and with shifting of the laminations during operation of their many circumferentially discontinuous components. This results in a drastically lower top speed. Similarly, stamped radial laminations for synchronous reluctance rotors require structural support material at the ends and in the middle of the magnetic insulation slots. This results in both structural weakness due to the small slot supports and reduced output power due to magnetic flux leakage through the slot supports. There are various types of machines utilizing rotors that require non-magnetic structural support, including synchronous reluctance machines, switched reluctance machines, induction machines, surface-type permanent magnet machines, circumferential-type interior permanent magnet machines, and spoke-type interior permanent magnet machines. Each of these machines utilize rotor components or rotor sense rings of composite magnetic, non-magnetic, plastic, electric and/or permanent magnet materials that suffer from the aforementioned problems.

Despite the aforementioned problems, and the general acceptance of conventional lamination practices as being cost effective and adequate in performance, new powder metal manufacturing technologies can significantly improve the performance of electric machines by bonding magnetic (permeable) and non-magnetic (non-permeable) materials together. Doing so permits the use of completely non-magnetic structural supports that not only provide the additional strength to allow the rotors to spin faster, for example up to 80% faster, but also virtually eliminate the flux leakage paths that the traditionally manufactured electric machines must include to ensure rotor integrity, but which lead to reduced power output and lower efficiency.

Powder metal manufacturing technologies that allow two or more powder metals to be bonded together to form a rotor core have been recently disclosed by the present inventors. Specifically, the following co-pending patent applications are directed to composite powder metal electric machine rotor cores fabricated by a compaction-sinter process: U.S. patent application Ser. No. 09/970,230 filed on Oct. 3, 2001 and entitled "Manufacturing Method and Composite Powder Metal Rotor Assembly for Synchronous Reluctance Machine"; U.S. patent application Ser. No. 09/970,197 filed on Oct. 3, 2001 and entitled "Manufacturing Method And Composite Powder Metal Rotor Assembly For Induction Machine"; U.S. patent application Ser. No. 09/970,223 filed on Oct. 3, 2001 and entitled "Manufacturing Method And Composite Powder Metal Rotor Assembly For Surface Type Permanent Magnet Machine"; U.S. patent application Ser. No. 09/970,105 filed on Oct. 3, 2001 and entitled "Manufacturing Method And Composite Powder Metal Rotor Assembly For Circumferential Type Interior Permanent Magnet Machine"; and U.S. patent application Ser. No. 09/970,106 filed on Oct. 3, 2001 and entitled "Manufacturing Method And Composite Powder Metal Rotor Assembly For Spoke Type Interior Permanent Magnet Machine," each of which is incorporated by reference herein in its entirety. Additionally, the following co-pending application is directed to composite powder metal electric machine rotor cores fabricated by metal injection molding: U.S. patent application Ser. No. 09/970,226 filed on Oct. 3, 2001 and entitled "Metal Injection Molding Multiple Dissimilar Materials To Form Composite Electric Machine Rotor And Rotor Sense Parts," incorporated by reference herein in its entirety. Both the compaction-sinter process and the metal injecting molding process (as disclosed in the above-referenced patent applications) lead to the advantages described above, such as strong structural support and virtually non-existent permeable flux leakage paths, and do provide an opportunity to manufacture an electric machine that costs less, spins faster, provides more output power, and is more efficient.

In the compaction-sinter process described in the above-identified co-pending applications, the magnetic and non-magnetic metal powders are poured into respective sections of a disk-shaped die insert. Upon removal of the die insert, the powders, after some settling and mixing along their boundaries, are compressed to a "green" strength, which is usually on the order of 2–6 ksi (13.8–41.4 MPa). The green part is then sintered, such as at about 2050° F. (1121° C.), for about one hour to obtain full strength, typically on the order of 30–50 ksi (207–345 MPa). One disadvantage of this compaction process is that the mixing that occurs after the die insert is removed can lead to blurred boundaries between permeable and non-permeable materials thereby reducing performance. Further, the blurring of boundaries is often particularly pronounced near the top and bottom of the pressed disks such that these sections of the machine do not adequately perform their intended function. To overcome this disadvantage, approximately one-third to two-thirds of the disk's thickness is ground away to leave a middle section having minimal blurring of boundaries that can be effectively utilized as an electric machine component.

The composite metal injection molding process described in the above-identified co-pending application does not exhibit the problem of boundary blurring like the composite compaction-sintering manufacturing process because the magnetic and non-magnetic materials are injection-molded separately into molds that provide definitive edges. However, the injection molding process can be expensive because liquifying the metals generally requires the use of powders that are more expensive and of finer grain size than the powders that can be used in the compaction process. Thus, composite metal injection molding may not be cost effective for a broad range of electric machine applications.

There is thus a need to provide a powder metallurgy manufacturing process that is cost effective and provides definitive boundaries between magnetic (permeable) and non-magnetic (non-permeable) portions of the electric machine components.

SUMMARY OF THE INVENTION

The present invention provides a method of making composite electric machine components using powder metal for magnetic and non-magnetic portions of the component. To this end, and in accordance with the present invention, one or more magnetically conducting segments are formed to a green strength by pressing soft ferromagnetic powder metal in a die of desired shape. Similarly, one or more magnetically non-conducting segments are formed to a green strength by pressing non-ferromagnetic powder metal in a die of desired shape. The green strength segments are positioned adjacent each other in a desired magnetic pattern, and powder metal is added between adjacent segments. The assembly is then sintered, advantageously to full strength, whereby a bond is formed between segments by the added powder metal.

In an exemplary embodiment for forming a rotor assembly, the segments are positioned to form a disk having the desired magnetic pattern, and a plurality of sinterbonded disks are stacked on a shaft with their magnetic patterns aligned. In an embodiment of the present invention, permanent magnets may be affixed to the composite component to form a permanent magnet electric machine component. Alternatively, permanent magnet segments may be formed to a green strength by pressing hard ferromagnetic powder metal in a die of desired shape, and then placing the permanent magnet segments in the desired magnetic pattern followed by sintering and magnetizing to form a permanent magnet electric machine component. By the method of the present invention, there is provided a structurally robust electric machine component having definite boundaries between magnetic regions that costs less, spins faster, provides more output power, and is more efficient.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a perspective view of a sinterbonded powder metal surface type permanent magnet rotor assembly of the present invention having a rotor positioned on a shaft, the rotor comprising a plurality of sinterbonded disks;

FIG. 2 is a partially exploded plan view of a partially assembled disk for the rotor assembly of FIG. 1 prior to sinterbonding;

FIG. 2A is an enlarged view of encircled area 2A of FIG. 2;

DETAILED DESCRIPTION

Figure 3A:
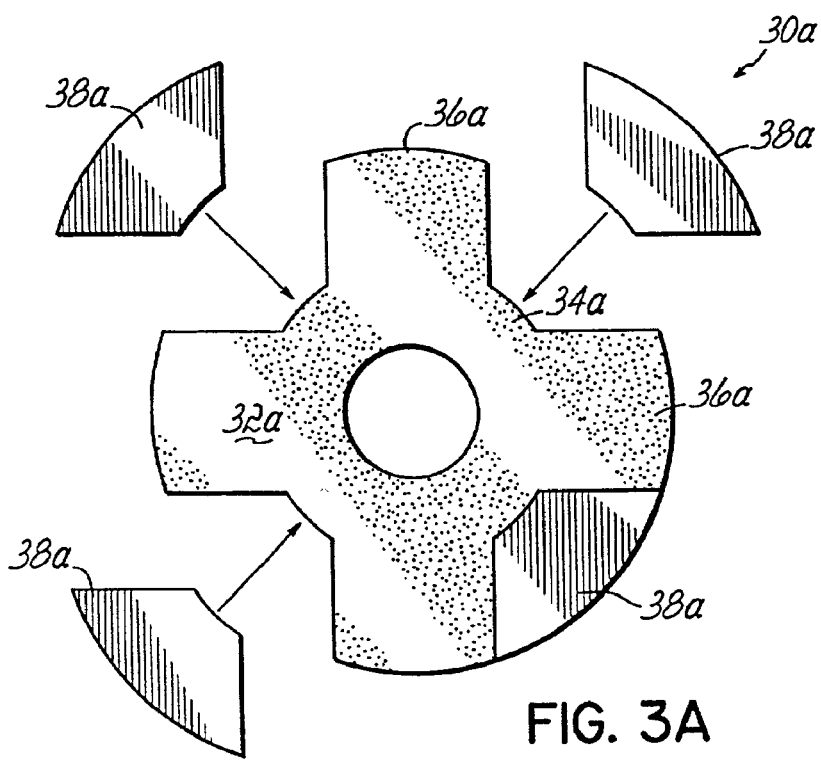
FIG. 3A is a partially exploded plan view of a partially assembled disk for a sinterbonded powder metal switched reluctance rotor assembly prior to sinterbonding.

The present invention is directed to sinterbonding electric machine components by pressing magnetically conducting and magnetically non-conducting rotor or stator segments separately to a green state, arranging the green-strength segments adjacent to each other with a small amount of powder material in between green-strength segments, and then sintering the whole assembly. The small amount of powder material, such as high purity iron powder, facilitates bond formation between the separate green-strength segments during sintering. By way of example and not limitation, the sinterbonding process of the present invention may be used on induction, permanent magnet, switched reluctance and synchronous reluctance rotors, as well as permanent magnet and reluctant sensor wheels. Sinterbonding combines the cost advantage of composite powder metal compaction manufacturing processing with the performance advantage of metal injection molding processing by allowing the magnetically conducting and magnetically non-conducting electric machine segments to be pressed separately and then bonded together during the sintering process. The sinterbonded product yields bond strengths equal to either of the prior powder metal processes, while at the same time reducing tooling costs because the tooling only has to be large enough to accommodate the individual segments and not the whole rotor or stator component. For example, on a ring machine used for an integral-starter generator application, the tooling for compaction or molding processes must be large enough to construct a 360 mm outer diameter core, whereas with the sinterbonding of the present invention, the largest tooling required would be for a 50 mm wide by 20 mm thick part.

An additional advantage of sinterbonding in accordance with the present invention is that less post-machining is required than with composite powder metal compaction-sinter processes. During material fill for the compaction-sinter process, the permeable and non-permeable materials may detrimentally mix along their boundaries prior to compaction, particularly near the top and bottom of the rotor disks. After the disks are sintered, the tops and bottoms often must be ground to leave only permeable and non-permeable materials that are clearly bonded together but distinct from each other. With sinterbonding, the materials are always distinct from each other because they are pressed separately, then sintered together. Thus, the sinterbonding process of the present invention eliminates the need for extensive bottom and top grinding of the disks that comprise the rotor or stator assembly. In addition, sinterbonding is less expensive than metal injection molding because it does not require the finer and more expensive powders generally required to liquify for the injection molding process.

Composite powder metal parts, whether they are compacted or injection-molded as described in the co-pending applications referred to above or whether they are sinterbonded in accordance with the present invention, have a cost, strength and performance advantage over traditional stamped electric machine cores. Composite powder metal components are less expensive because they can be formed in greater piece thicknesses and can be formed into near-net shape parts with little or no scrap material. Composite powder metal cores are stronger than traditional stamped electric machine cores because most electric machine components must minimize the use of non-permeable materials used as structural elements to avoid flux leakage and lower machine performance, whereas composite powder metal components may utilize relatively large amounts of non-permeable material, for example stainless steel, for the structural elements while minimizing or eliminating the magnetic flux leakage pathways. With less or no flux leakage, they also perform better in terms of output power, power factor and efficiency. By way of example, a four-inch diameter induction rotor comprising stamped laminations and aluminum bars and end rings, when subjected to spin testing, fails at about 28,000 rpm, whereas a four-inch diameter synchronous reluctance rotor of the present invention does not fail until about 44,600 rpm. Thus, the sinterbonding process of the present invention reduces tooling costs and produces electric machine components that are less expensive, stronger, faster and more efficient than those produced by prior techniques.

In general, a rotor assembly comprises an annular core having at least one magnetically conducting segment and at least one magnetically non-conducting segment. The magnetically conducting segments comprise soft ferromagnetic materials, also referred to as permeable or magnetic materials. The magnetically non-conducting segments comprise non-ferromagnetic material, also referred to as non-permeable or non-magnetic materials. In the present invention, the magnetically conducting segments and magnetically non-conducting segments are fabricated from pressed and sintered soft ferromagnetic and non-ferromagnetic powder metals. In permanent magnet rotor assemblies, the assembly further comprises permanent magnets, which are formed from hard ferromagnetic materials. In the present invention, the permanent magnets may be formed from pressed and sintered hard ferromagnetic powder metal, or may be prefabricated magnets that are affixed to the sinterbonded component. In induction rotor assemblies, the assembly further comprises conductors that are generally made of aluminum or copper. For example, aluminum conductors may be cast into slots in the sinterbonded rotor assembly, or prefabricated copper bars may be inserted into the slots and affixed to axial end rings.

The electric machine components may be fabricated by sinterbonding magnetically conducting and magnetically non-conducting segments to form a plurality of composite disks of a desired magnetic pattern, and stacking the disks axially along a shaft and affixing the disks to the shaft to form the rotor assembly. The shaft is typically equipped with a key and the individual disks have a keyway on an interior surface to mount the disks to the shaft upon pressing the part to the shaft. The magnetic patterns of the individual disks are aligned with respect to each other along the shaft such that the magnetic flux paths are aligned along the shaft. In the present invention, there is no limit to the thickness of each composite powder metal disk or the number of disks that may be utilized to construct a rotor assembly.

In an embodiment of the present invention, the soft ferromagnetic powder metal used to form magnetically conducting segments is nickel, iron, cobalt or an alloy thereof. In another embodiment of the present invention, this soft ferromagnetic metal is a low carbon steel or a high purity iron powder with a minor addition of phosphorus, such as covered by MPIF (Metal Powder Industry Federation) Standard 35 F-0000, which contains approximately 0.27% phosphorus. In general, AISI 400 series stainless steels are magnetically conducting, and may be used in the present invention.

In an embodiment of the present invention, the non-ferromagnetic powder metal used to form magnetically non-conducting segments is austenitic stainless steel, such as SS316. In general, the AISI 300 series stainless steels are non-magnetic and may be used in the present invention. Also, the AISI 8000 series steels are non-magnetic and may be used.

In an embodiment of the present invention, the soft ferromagnetic metal and the non-ferromagnetic metal are chosen so as to have similar densities and sintering temperatures, and are approximately of the same strength, such that upon compaction and sinterbonding, the materials behave in a similar fashion. In an embodiment of the present invention, the soft ferromagnetic powder metal is Fe-0.27% P and the non-ferromagnetic powder metal is SS316.

In an embodiment of the present invention, the small amount of powder metal added between the green-strength segments is a soft ferromagnetic material, such as described above. For example, the small amount of added powder metal may be high purity iron powder, such as covered by MPIF Standard 35 F-0000. In another embodiment of the present invention, the small amount of added powder metal is the same powder metal as used to form the magnetically conducting segments of the rotor or stator components. Alternatively, the small amount of added powder metal may be a non-ferromagnetic material, such as described above. For example, the small amount of added powder metal may be an austenitic stainless steel, such as SS316. In yet another embodiment of the present invention, the small amount of added powder metal is the same powder metal as used to form the magnetically non-conducting segments of the rotor or stator components.

In an embodiment of the present invention relating to permanent magnet machines, the hard ferromagnetic powder metal used to form permanent magnet segments is ferrite or rare earth metals. Alternatively, the permanent magnets may be prefabricated magnets that are affixed to adjacent segments in the rotor component after sinterbonding.

In accordance with the present invention, the ferromagnetic and non-ferromagnetic powder metals are pressed separately in individual dies to form the compacted powder metal segments, or green-strength segments. The compacted powder metal segments are then positioned adjacent to each other in the desired magnetic pattern. A small amount of powder metal is then provided between the green-strength segments, and the arrangement is then sintered to form a sinterbonded powder metal component or lamination having at least one region of magnetically non-conducting material and at least one region of magnetically conducting material, the component exhibiting high structural stability and definitive boundaries between regions. The component may be an annular disk-shaped component for affixing to a shaft to form a rotor assembly. The amount of powder metal provided between green-strength segments may be any amount deemed necessary or adequate for a bond to form between the segments.

The pressing or compaction of the filled powder metal to form the green-strength segments may be accomplished by uniaxially pressing the powder in a die, for example at a pressure of about 45–50 tsi (620–689 MPa). The die is shaped to correspond to the particular segment being fabricated. It should be understood that the pressure needed is dependent upon the particular powder metal materials that are chosen. In a further embodiment of the present invention, the pressing of the powder metal involves heating the die to a temperature in the range of about 275° F. (135° C.) to about 290° F. (143° C.), and heating the powder within the die to a temperature in the range of about 175° F. (79° C.) to about 225° F. (107° C.).

In an embodiment of the present invention, the sintering together of the green-strength segments with added powder therebetween comprises heating the green-strength segments and added powder metal to a first temperature of about 1400° F. (760° C.) and holding at that temperature for about one hour. Generally, the powder metals used to fabricate the segments include a lubricating material, such as a plastic, on the particles to increase the strength of the material during compaction. The internal lubricant reduces particle-to-particle friction, thus allowing the compacted powder to achieve a higher strength after sintering. The lubricant is then burned out of the composite during this initial sintering operation, also known as a delubrication or delubing step. A delubing for one hour is a general standard practice in the industry and it should be appreciated that times above or below one hour are sufficient for the purposes of the present invention if delubrication is achieved thereby. Likewise, the temperature may be varied from the general industry standard if the ultimate delubing function is performed thereby.

After delubing, the sintering temperature is raised to a full sintering temperature, which is generally in the industry about 2050° F. (1121° C.). During this full sintering, the compacted powder shrinks, and particle-to-particle bonds are formed, generally between iron particles. For the particles that comprise the small amount of powder metal added between green-strength segments, the particles bond to each other and to particles that comprise the magnetically conducting and non-conducting segments to thereby bond the segments to each other. Standard industry practice involves full sintering for a period of one hour, but it should be understood that the sintering time and temperature may be adjusted as necessary. The sintering operation may be performed in a vacuum furnace, and the furnace may be filled with a controlled atmosphere, such as argon, nitrogen, hydrogen or combinations thereof. Alternatively, the sintering process may be performed in a continuous belt furnace, which is also generally provided with a controlled atmosphere, for example a hydrogen/nitrogen atmosphere such as 75% $H_2$/25% $N_2$. Other types of furnaces and furnace atmospheres may be used within the scope of the present invention as determined by one skilled in the art.

The sinterbonded powder metal components of the present invention typically exhibit magnetically conducting segments having at least about 95% of theoretical density, and typically between about 95%–98% of theoretical density. Wrought steel or iron has a theoretical density of about 7.85 gms/cm$^3$, and thus, the magnetically conducting segments exhibit a density of around 7.46–7.69 gms/cm$^3$. The non-conducting segments of the powder metal components of the present invention exhibit a density of at least about 85% of theoretical density, which is on the order of about 6.7 gms/cm$^3$. Thus, the non-ferromagnetic powder metals are less compactable than the ferromagnetic powder metals. The pressed and sintered hard ferromagnetic powder metal magnets of certain embodiments of the present invention exhibit a density of at least 95.5% ± about 3.5% of theoretical density, depending on fill factor, which is on the order of about 3.8–7.0 gms/cm$^3$. The sinterbonding method for forming these rotor components provides increased mechanical integrity, reduced flux leakage, more efficient flux channeling, reduced tooling cost, and simpler construction.

To further explain the method of the present invention and the composite powder metal components formed thereby, reference is made to the following figures in which there are depicted exemplary components for various electric machines. The components depicted are by no means exhaustive of the range of applicability of the present invention. All green-strength segments described in reference to the figures are fabricated individually by compacting an appropriate powder metal in a die having the desired segment shape, as described above.

FIG. 1 depicts in perspective view a powder metal surface permanent magnet rotor assembly 10 of the present invention having a plurality of sinterbonded powder metal composite disks 12 aligned and mounted on a shaft 14, the disks 12 each having an inner annular magnetically conducting segment 16 and a plurality of spaced magnetically non-conducting segments 18 separated by a plurality of alternating polarity permanent magnets 20. The magnetically non-conducting segments 18 provide insulation that in part directs the magnetic flux from one permanent magnet 20 to the next alternating polarity permanent magnet 20.

A partially assembled, unsintered disk 12a is depicted in FIG. 2 in a partially exploded plan view. The inner annular segment 16 is formed by compacting a soft ferromagnetic powder metal in a die to form a green-strength conducting segment 16a. The magnetically non-conducting segments 18 are each formed by compacting a non-ferromagnetic powder metal in a die to form green-strength non-conducting segments 18a. In the particular embodiment of the present invention depicted in FIG. 2, the permanent magnets 20 are each formed by compacting a hard ferromagnetic powder metal in a die to form green-strength permanent magnets 20a. The alternating polarity may be created after sinterbonding. The green-strength magnetically non-conducting segments 18a and green-strength permanent magnet segments 20a are placed adjacent the green-strength inner annular magnetically conducting segment 16a in alternating relation, as indicated by the arrows. FIG. 2A depicts, in an enlarged view, a portion of disk 12a to show the green-strength segments 16a, 18a, 20a that are individually fabricated and then positioned adjacent each other with powder metal 22 added between segments for sintering to form the sinterbonded disk 12 of FIG. 1. Alternatively, the permanent magnets 20 may be prefabricated magnets that are added after sinterbonding green-strength magnetically non-conducting segments 18a to green-strength magnetically conducting segment 16a. Spacing inserts (not shown) may be temporarily placed between segments 18a to facilitate proper positioning around segment 16a. The inserts are removed, and prefabricated magnets 20 may then be adhesively affixed to sinterbonded segments 18 and/or 16.

Figure 3B:
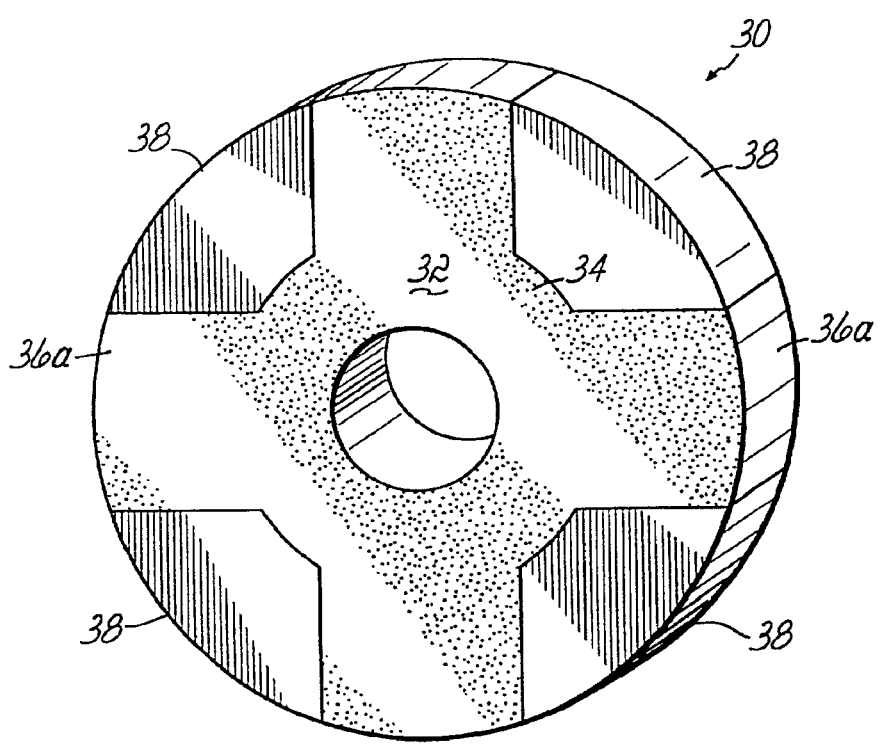
FIG. 3B is a perspective view of the assembled and sinterbonded disk of FIG. 3A.

FIG. 3A depicts in partially exploded plan view a partially assembled unsintered disk 30a for a composite powder metal switched reluctance rotor assembly of the present invention (not shown). The disk 30a includes a green-strength magnetically conducting segment 32a that has a yoke portion 34a and a plurality of equiangular spaced, radially extending teeth 36a defining channels there between. Green-strength magnetically non-conducting segments 38a are placed, as indicated by the arrows, in the channels between the teeth 36a. Added powder metal (not shown) is added between adjacent segments 32a and 38a. The segments are then subjected to sintering to bond the segments together. FIG. 3B depicts in perspective view the fully assembled and sintered disk 30 from FIG. 3A having magnetically non-conducting segments 38 sinterbonded to magnetically conducting segment 32. A plurality of disks 30 may be affixed to a shaft to form a rotor assembly. The non-conducting segments 38 function to cut down on windage losses, and more particularly, a switched reluctance machine incorporating the powder metal rotor disks 30 of the present invention exhibits low windage losses as compared to assemblies comprising stamped laminations.

Figure 4A:
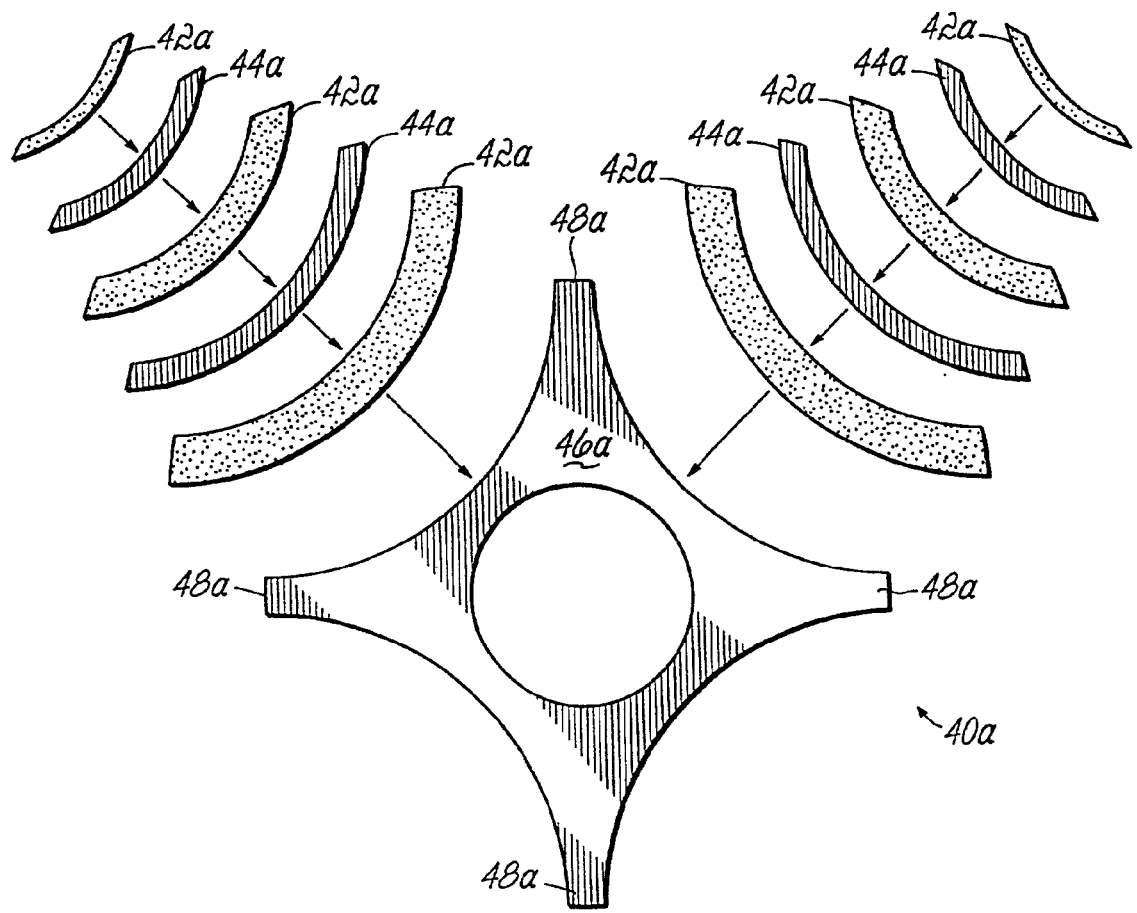
FIG. 4A is an exploded plan view of a disassembled disk for a sinterbonded powder metal synchronous reluctance rotor assembly prior to sinterbonding.
Figure 4B:
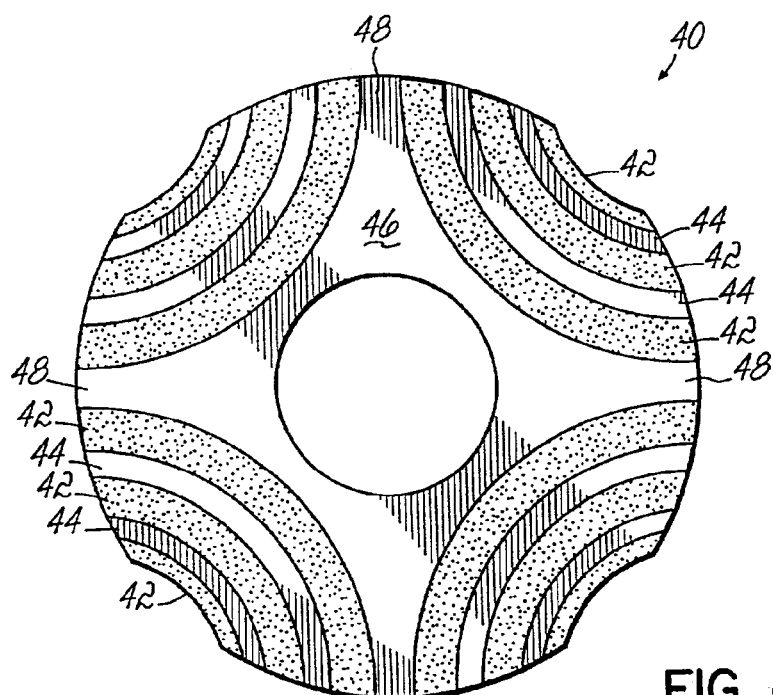
FIG. 4B is a plan view of the assembled and sinterbonded disk of FIG. 4B.

FIG. 4A depicts in partially exploded plan view an unassembled, unsintered disk 40a for a composite powder metal synchronous reluctance rotor assembly of the present invention (not shown). The disk 40a includes a plurality of alternating green-strength magnetically conducting arcuate segments 42a and non-conducting arcuate segments 44a, which are placed, as indicated by the arrows, in stacked arrangements adjacent a green-strength magnetically non-conducting segment 46a. This segment 46a essentially forms four equiangular spaced, radially extending arm portions 48a that define axially extending channels there between, in which segments 42a, 44a, are alternately placed. Added powder metal (not shown) is added between adjacent segments 42a, 44a, and 46a. The segments are then subjected to sintering to bond the segments together. FIG. 4b depicts in plan view the fully assembled and sintered disk 40 from FIG. 4A having magnetically non-conducting segment 46 with arm portions 48 forming channels, and within those channels are alternating layers of magnetically conducting segments 42 and magnetically conducting segments 44. It should be understood, however, that a disk for a synchronous reluctance rotor assembly may be formed of an opposite magnetic pattern in which the segment having the arm portions may be conducting, with alternating magnetically nonconducting segments and magnetically conducting segments in the channels. A variety of other magnetic configurations are known and well within the skill of one in the art. A plurality of disks 40 may be affixed to a shaft to form a powder metal rotor assembly. A synchronous reluctance machine incorporating the powder metal rotor disks 40 of the present invention exhibits power density and efficiency comparable to induction motors and improved high speed rotating capability, yet may be produced at a lower cost.

Figure 5A:
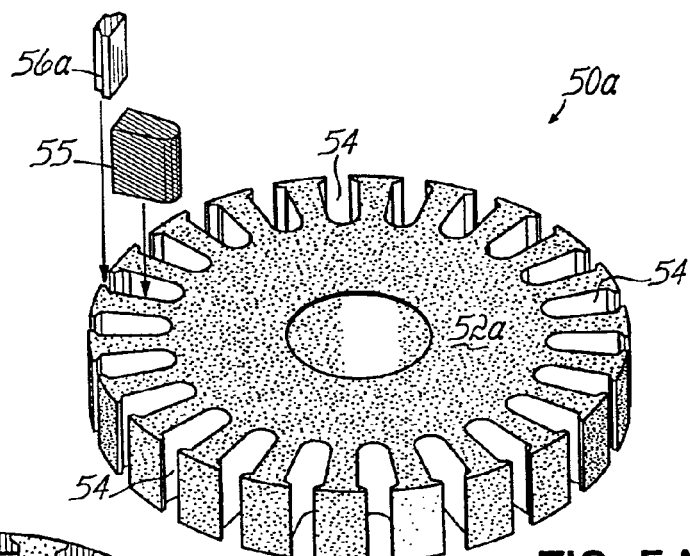
FIG. 5A is an exploded perspective view of a disassembled disk for a sinterbonded powder metal induction rotor assembly prior to sinterbonding and prior to adding the rotor conductors.
Figure 5B:
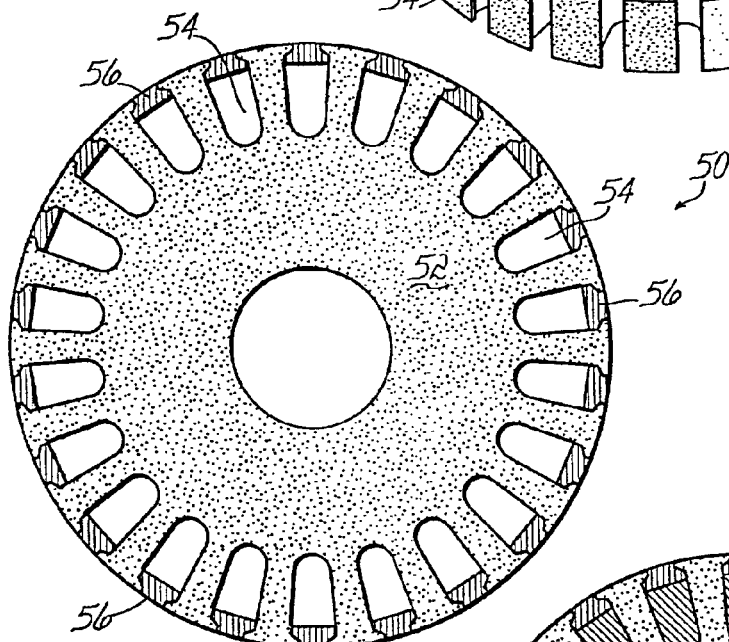
FIG. 5B is a plan view of the assembled disk of FIG. 5A after sinterbonding.
Figure 5C:
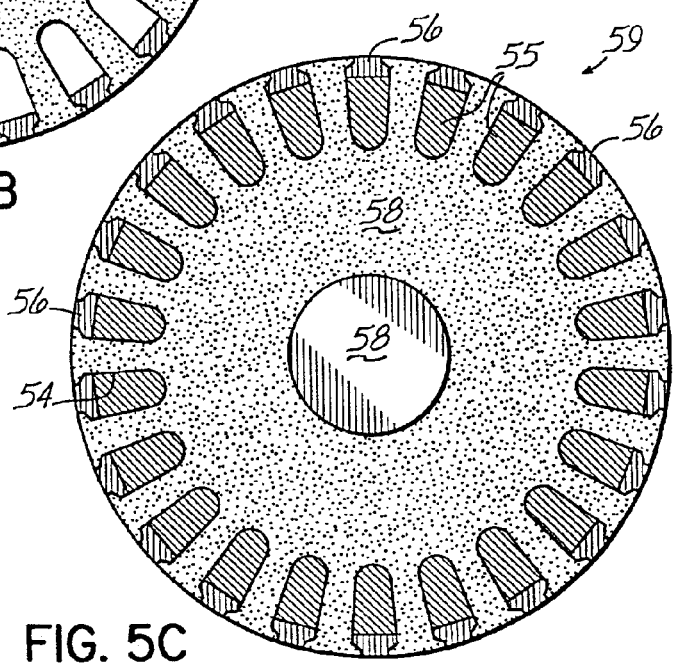
FIG. 5C is a plan view of a rotor assembly including the disk of FIG. 5B after adding the rotor conductors.

FIG. 5A depicts in partially exploded perspective view an unassembled, unsintered disk 50a for a composite powder metal induction rotor assembly of the present invention (not shown), the disk 50a having a green-strength magnetically conducting segment 52a and a plurality of slots or slot openings 54 extending along the axial length of the segment 52a for receiving a plurality of conductors 55. A green-strength magnetically non-conducting segment 56a is placed in each slot 54, as indicated by the arrow, to thereby cap or enclose the slot opening 54. Powder metal (not shown) is added between adjacent segments 52a and 56a, and the segments are then subjected to sintering to bond the segments together. FIG. 5B depicts in plan view a fully assembled and sintered disk 50 from FIG. 5A having a magnetically conducting segment 52 with spaced axially extending slots 54 around the exterior surface of the segment 52 for receiving a plurality of conductors 55, and magnetically non-conducting segments 56 enclosing each slot opening 54 adjacent the exterior surface of the segment 52. A plurality of disks 50 may be affixed to a shaft 58 with the slots 54 aligned axially along the shaft, and conductors 55 are then added in the aligned slots 54, as indicated by the arrow in FIG. 5A, to form a composite powder metal rotor assembly 59, as depicted in FIG. 5C. The conductors 55 may be cast into the aligned slots 54 of the composite disks 50 or may be prefabricated bars inserted into the slots 54. Thus, each slot 54 receives a conductor 55 in a radially inner portion of the slot 54, and a radially outer portion of the slot 54 comprises the non-conducting segment 56 such that the conductors 55 are embedded within the rotor assembly 59. An induction machine incorporating the powder metal rotor assembly 59 of the present invention can obtain high speeds with low flux leakage, and yet may be produced at a lower cost.

Figure 6A:
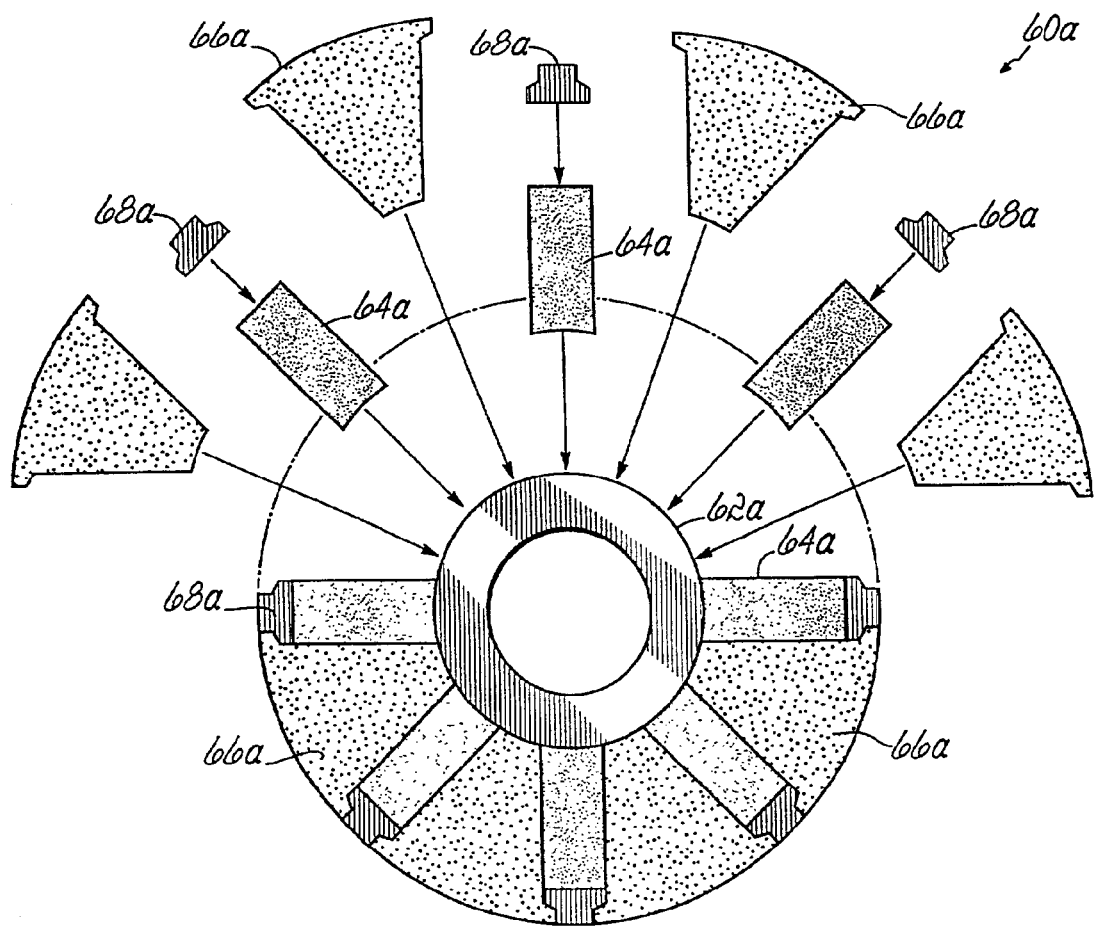
FIG. 6A is a partially exploded plan view of a partially assembled disk for a sinterbonded powder metal spoke type interior permanent magnet rotor assembly prior to sinterbonding.
Figure 6B:
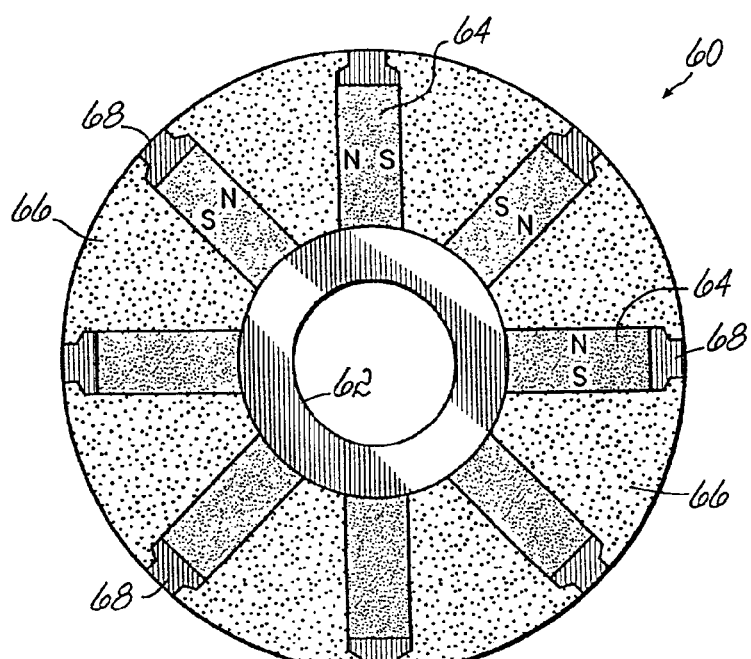
FIG. 6B is a plan view of the assembled and sinterbonded disk of FIG. 6A.

FIG. 6A depicts in partially exploded plan view a partially assembled, unsintered disk 60a for a composite powder metal spoke type interior permanent magnet rotor assembly of the present invention (not shown). The disk 60a includes an inner annular green-strength magnetically non-conducting segment 62a around which is placed, as indicated by the arrows, a plurality of green-strength permanent magnet segments 64a separated by green-strength magnetically conducting segments 66a. A radially outer green-strength magnetically non-conducting segment 68a is placed adjacent each permanent magnet segment 64a for embedding the permanent magnet segment 64a in the disk 60a. Powder metal (not shown) is added between adjacent segments 62a, 64a, 66a and 68a. The segments are then subjected to sintering to bond the segments together. FIG. 6B depicts in plan view the fully assembled and sintered disk 60 from FIG. 6A having an inner annular magnetically non-conducting segment 62, a plurality of alternating polarity permanent magnets 64 (polarized subsequent to sinterbonding) separated by magnetically conducting segments 66 and radially embedded by magnetically non-conducting segments 68. Two adjacent permanent magnets 64 direct their magnetic flux into the intermediate conducting segment 66, which forms one rotor pole, and the next adjacent rotor pole will be of opposite polarity. As with FIG. 2 above, permanent magnets 64 are depicted as compacted and sinterbonded hard ferromagnetic powder metal segments, but may alternatively be prefabricated and affixed to adjacent segments after sinterbonding. A plurality of disks 60 may be affixed to a shaft to form a powder metal rotor assembly. A spoke type interior permanent magnet machine incorporating the powder metal rotor disks 60 of the present invention exhibits flux concentration, minimal flux leakage and permits the motor to produce more power than a circumferential interior permanent magnet motor or to produce the same power using less powerful and less expensive magnets, and may be produced at a lower overall cost.

Figure 7A:
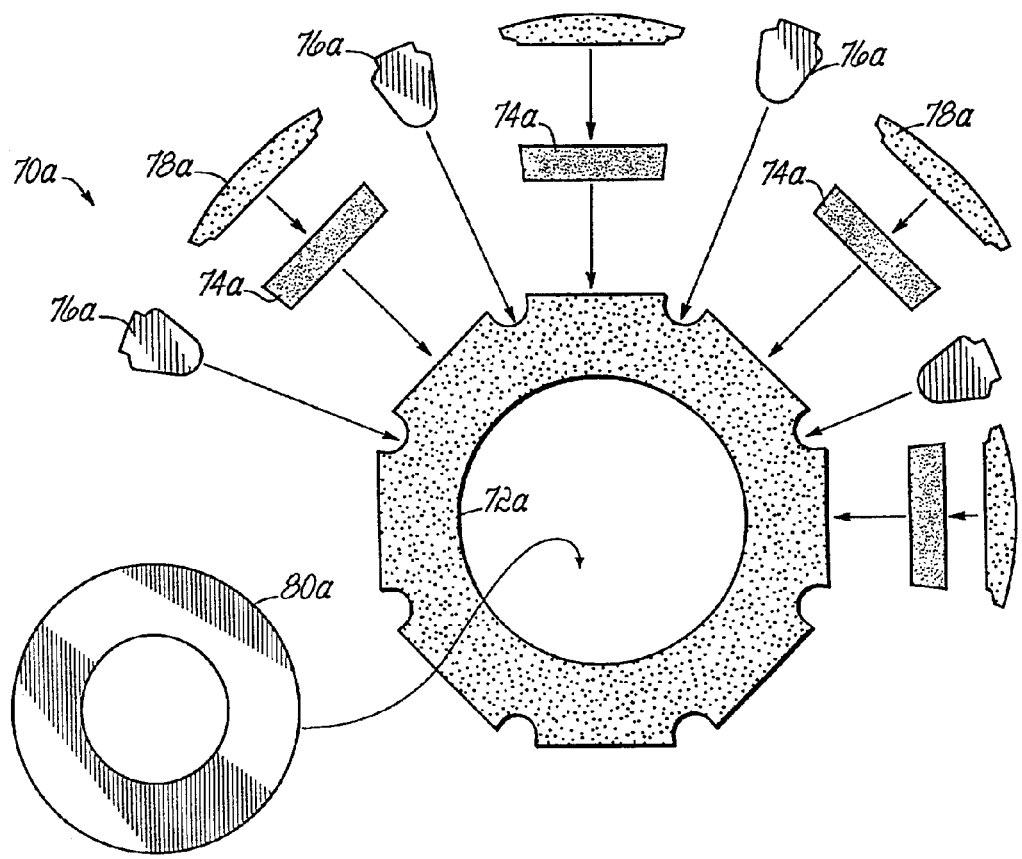
FIG. 7A is an exploded plan view of a disassembled disk for a sinterbonded powder metal circumferential type interior permanent magnet rotor assembly prior to sinterbonding.
Figure 7B:
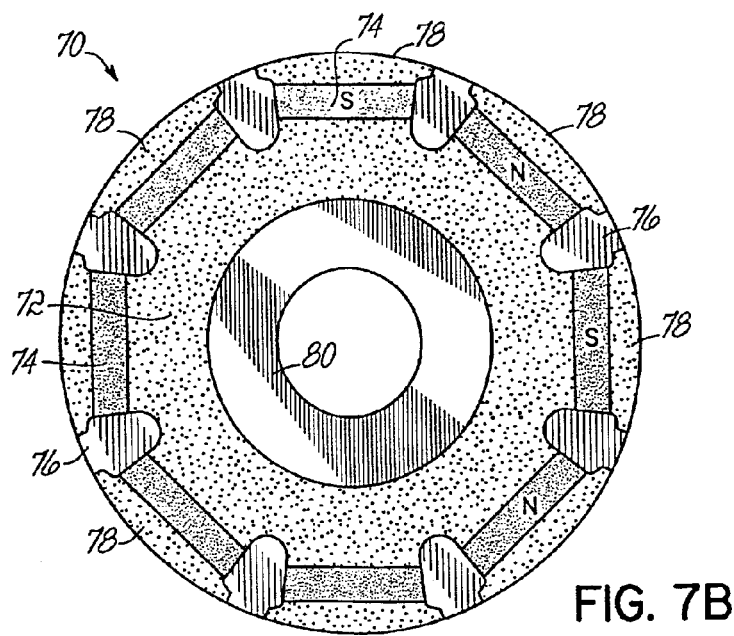
FIG. 7B is a plan view of the assembled and sinterbonded disk of FIG. 7A.

FIG. 7A depicts in exploded plan view an unassembled, unsintered disk 70a for a composite powder metal circumferential type interior permanent magnet rotor assembly of the present invention (not shown). Disk 70a includes a green-strength inner annular magnetically conducting segment 72a, around which is placed, as indicated by the arrows, a plurality of green-strength permanent magnet segments 74a and a plurality of green-strength magnetically non-conducting barrier segments 76a for separating the permanent magnet segments 74a. A plurality of radially outer green-strength magnetically conducting segments 78a are placed adjacent each permanent magnet segment 74a for embedding the permanent magnet 74a in the disk 70a. FIG. 7A further depicts placing an optional green-strength inner annular magnetically non-conducting insert 80a within segment 72a. Added powder metal (not shown) is added between adjacent segments 72a, 74a, 76a, 78a and 80a. The segments are then subjected to sintering to bond the segments together. FIG. 7B depicts in plan view the fully assembled and sintered disk 70 from FIG. 7A having an inner annular magnetically conducting segment 72 and an inner annular magnetically non-conducting insert 80 therein. Positioned around segment 72 is a plurality of circumferentially extending alternating polarity permanent magnets 74 (polarized after sinterbonding) separated in between by magnetically non-conducting barrier segments 76. The non-conducting segments 76 provide insulation that in part directs the magnetic flux from one permanent magnet 74 to the next alternating polarity permanent magnet 74. The insert 80 blocks magnetic flux from being channeled into the shaft (not shown) when the rotor assembly (not shown) is operating. The permanent magnets 74 are also circumferentially embedded by radially outer magnetically conducting segments 78. As with FIG. 2 above, the permanent magnets are depicted as compacted and sinterbonded hard ferromagnetic powder metal segments, but may alternatively be prefabricated magnets affixed to adjacent segments after sinterbonding. A plurality of disks 70 may be affixed to a shaft to form a powder metal rotor assembly. A circumferential type interior permanent magnet machine incorporating the powder metal rotor disks 70 of the present invention exhibits increased power and speed capabilities, lower flux leakage, and may be produced at a lower cost.

While the present invention has been illustrated by the description of one or more embodiments thereof, and while those embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method of making a composite electric machine component of a desired magnetic pattern, the method comprising:

placing at least one green-strength magnetically conducting segment and at least one green-strength magnetically non-conducting segment adjacent in the desired magnetic pattern;

adding powder metal between the segments; and sintering the segments and added powder metal whereby the segments are bonded together by the added powder metal to form the composite electric machine component.

2. The method of claim 1 further comprising forming the at least one green-strength magnetically conducting segment by pressing a soft ferromagnetic powder metal in a die and forming the at least one green-strength magnetically non-conducting segment by pressing a non-ferromagnetic powder metal in a die.

3. The method of claim 2 wherein the added powder metal is the soft ferromagnetic powder metal.

4. The method of claim 2 wherein the added powder metal is the non-ferromagnetic powder metal.

5. The method of claim 2 wherein the soft ferromagnetic powder metal is Ni, Fe, Co or an alloy thereof.

6. The method of claim 2 wherein the soft ferromagnetic powder metal is a high purity iron powder with a minor addition of phosphorus.

7. The method of claim 2 wherein the non-ferromagnetic powder metal is an austenitic stainless steel.

8. The method of claim 2 wherein the non-ferromagnetic powder metal is an AISI 8000 series steel.

9. The method of claim 2 wherein pressing comprises uniaxially pressing the powder in the die.

10. The method of claim 9 wherein pressing comprises pre-heating the powder and pre-heating the die.

11. The method of claim 1 wherein the added powder metal comprises a magnetically conducting material.

12. The method of claim 1 wherein the added powder metal comprises a magnetically non-conducting material.

13. The method of claim 1 wherein sintering includes delubricating the segments by heating to a first temperature, followed by fully sintering the segments by heating to a second temperature greater than the first temperature.

14. The method of claim 1 further comprising forming at least one green-strength permanent magnet segment by pressing a hard ferromagnetic powder metal in a die, placing the green-strength permanent magnet segments adjacent the magnetically conducting segments and magnetically non-conducting segments in the desired magnetic pattern, and after sintering, magnetizing the permanent magnet segments to form a permanent magnet electric machine component.

15. The method of claim 1 further comprising, after sintering, adding a plurality of alternating polarity permanent magnets to the composite electric machine component to form a permanent magnet electric machine component.

* * * * *